(12) United States Patent
Suchezky

(10) Patent No.: US 11,041,442 B2
(45) Date of Patent: Jun. 22, 2021

(54) SELF-ERODING SINGLE-USE GAS-TURBINE-ENGINE IGNITER

(71) Applicant: WILLIAMS INTERNATIONAL CO., L.L.C., Pontiac, MI (US)

(72) Inventor: Mark E. Suchezky, South Lyon, MI (US)

(73) Assignee: WILLIAMS INTERNATIONAL CO., L.L.C., Pontiac, MI (US)

( * ) Notice: Subject to any disclaimer, the term of this patent is extended or adjusted under 35 U.S.C. 154(b) by 100 days.

(21) Appl. No.: 16/212,606

(22) Filed: Dec. 6, 2018

(65) Prior Publication Data

US 2020/0025095 A1 Jan. 23, 2020

Related U.S. Application Data

(60) Provisional application No. 62/595,244, filed on Dec. 6, 2017.

(51) Int. Cl.
*F02C 7/266* (2006.01)
*F42B 3/12* (2006.01)
*F42B 3/11* (2006.01)

(52) U.S. Cl.
CPC .............. *F02C 7/266* (2013.01); *F42B 3/11* (2013.01); *F42B 3/125* (2013.01)

(58) Field of Classification Search
CPC .. F02C 7/264; F02C 7/266; F02C 9/95; F42B 3/12; F42B 3/128; F42B 3/125; F42B 3/11
USPC ............. 102/202.5, 202.7, 202.11, 202.14
See application file for complete search history.

(56) References Cited

U.S. PATENT DOCUMENTS

| 3,059,576 | A | | 10/1962 | Haefner | |
|---|---|---|---|---|---|
| 3,357,190 | A | * | 12/1967 | Cassidy | F02K 9/95 60/256 |
| 3,420,174 | A | * | 1/1969 | Potter | F42B 3/18 102/202.6 |

(Continued)

FOREIGN PATENT DOCUMENTS

| CN | 102927590 A | 2/2013 |
|---|---|---|
| CN | 202955726 U | 5/2013 |

(Continued)

OTHER PUBLICATIONS

Jayaraman, K. "Development of Pyro Igniter for Gas Turbine Engine Application", ASME, p. 1-6 (Year: 2013).*

*Primary Examiner* — Todd E Manahan
*Assistant Examiner* — Thuyhang N Nguyen
(74) *Attorney, Agent, or Firm* — Raggio & Dinnin, P.C.; Kurt L. VanVoorhies

(57) ABSTRACT

A sacrificial outer sleeve of a self-eroding single-use gas-turbine-engine igniter contains a main pyrotechnic composition and an initiator embedded therein proximate to a distal portion of the sacrificial outer sleeve. The sacrificial outer sleeve extends within a combustion chamber of the gas-turbine engine when operatively coupled thereto so as to provide for igniting a fuel/air mixture therein. The sacrificial outer sleeve is constructed of a material that is consumable either responsive to combustion of the main pyrotechnic composition responsive to activation of the initiator responsive to an actuation signal communicated via an associated signal conduit, or, responsive to a subsequent operation of said gas-turbine engine to which the igniter is operatively coupled, when operatively coupled thereto.

37 Claims, 6 Drawing Sheets

(56) References Cited

U.S. PATENT DOCUMENTS

| | | | |
|---|---|---|---|
| 4,036,139 A | | 7/1977 | Eckels |
| 4,716,832 A | | 1/1988 | Sumner |
| 4,938,021 A | | 7/1990 | Jones et al. |
| 4,989,515 A | * | 2/1991 | Kelly ................ C06B 33/00 102/202.5 |
| 5,115,637 A | | 5/1992 | Shekleton |
| 5,370,054 A | | 12/1994 | Reams et al. |
| 6,276,276 B1 | | 8/2001 | Erickson |
| 6,936,303 B1 | * | 8/2005 | Katsuda ............ B60R 21/2644 29/592.1 |
| 6,941,868 B2 | | 9/2005 | Herget |
| 8,104,404 B2 | | 1/2012 | Maeda et al. |
| 2011/0073224 A1 | * | 3/2011 | Heister ............ C06B 21/0025 149/18 |
| 2016/0238354 A1 | * | 8/2016 | Hinkofer ............ F42B 3/125 |

FOREIGN PATENT DOCUMENTS

| | | |
|---|---|---|
| CN | 103396282 B | 3/2016 |
| CN | 105674808 A | 6/2016 |

\* cited by examiner

SELF-ERODING SINGLE-USE GAS-TURBINE-ENGINE IGNITER

CROSS-REFERENCE TO RELATED APPLICATIONS

The instant application claims the benefit of prior U.S. Provisional Application Ser. No. 62/595,244 filed on 6 Dec. 2017, which is incorporated herein by reference in its entirety.

DESCRIPTION OF EMBODIMENT(S)

Figure 1:
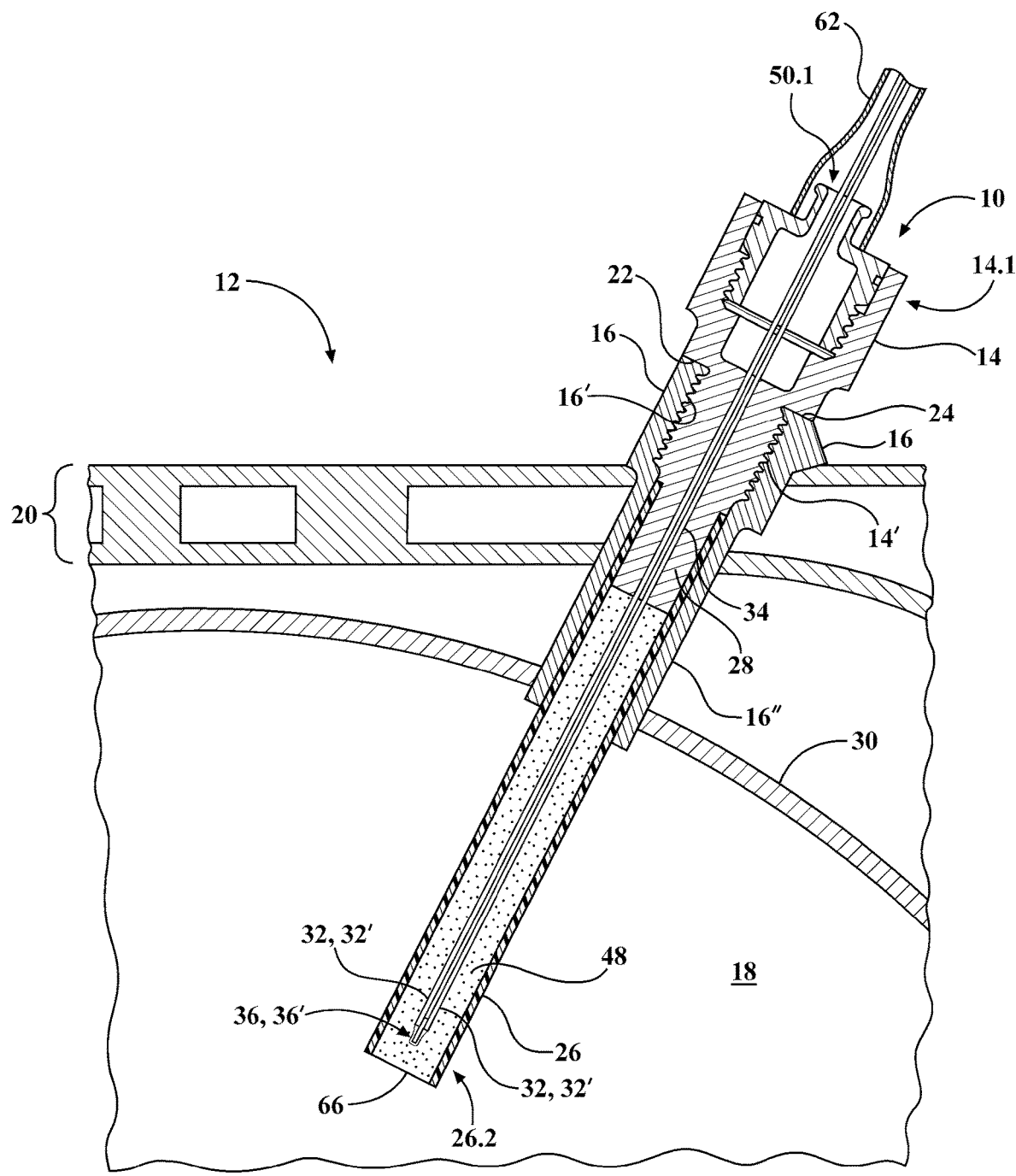
FIG. 1 illustrates a fragmentary cross-sectional view of a portion of a combustion chamber of a gas-turbine engine incorporating a self-eroding single-use gas-turbine-engine igniter.
Figure 2:
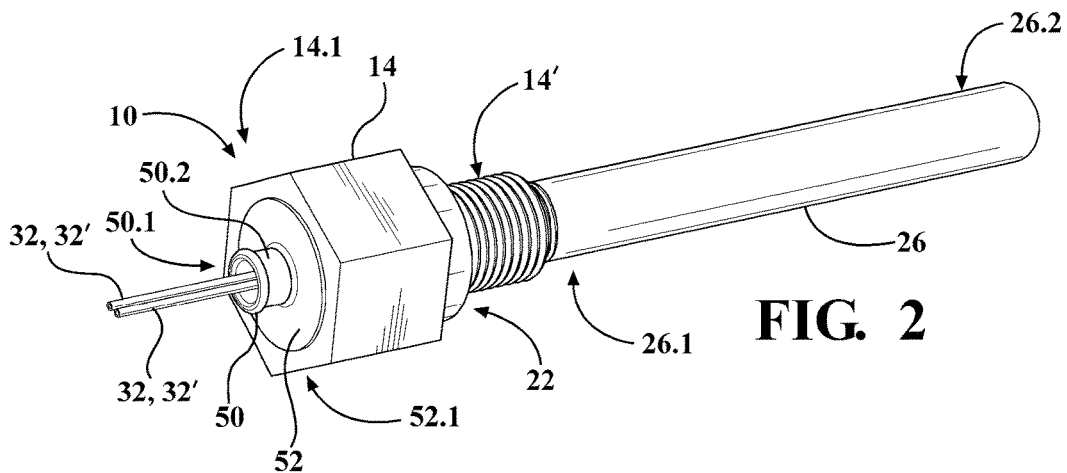
FIG. 2 illustrates an isometric view of the self-eroding single-use gas-turbine-engine igniter illustrated in FIG. 1, in isolation from the gas-turbine engine.
Figure 3:
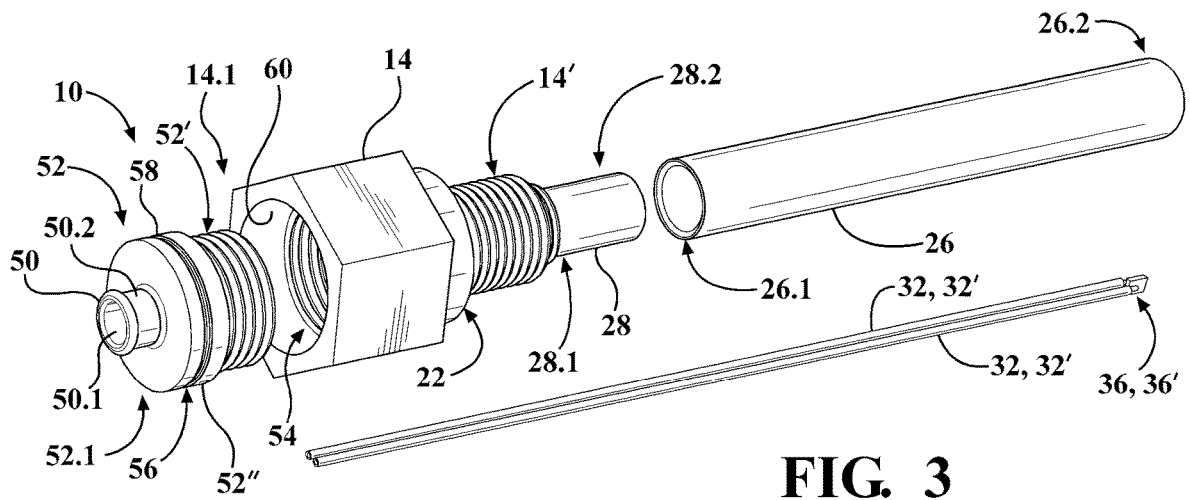
FIG. 3 illustrates an exploded view of the self-eroding single-use gas-turbine-engine igniter illustrated in FIGS. 1 and 2.
Figure 4:
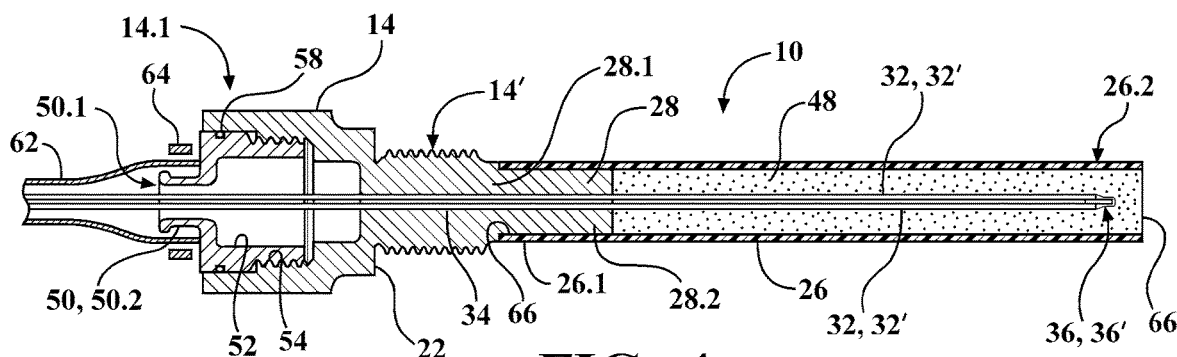
FIG. 4 illustrates a cross-sectional view of the self-eroding single-use gas-turbine-engine igniter illustrated in FIGS. 1 through 3.

Referring to FIG. 1, a self-eroding single-use gas-turbine-engine igniter 10 is incorporated in an expendable gas-turbine engine 12, for example, as might be used in a missile system. Referring also to FIGS. 2-4, an externally-threaded portion 14' of a body 14 of the self-eroding single-use gas-turbine-engine igniter 10 is threaded into an internally-threaded portion 16' of a receptacle 16 outside the combustion chamber 18 of the gas-turbine engine 12 so as to provide for attaching the self-eroding single-use gas-turbine-engine igniter 10 to the gas-turbine engine 12 from a location external to the outermost wall 20 of the combustion chamber 18, wherein an annular face 22 of the body 14 of the self-eroding single-use gas-turbine-engine igniter 10 becomes sealed against a corresponding annular face 24 of the receptacle 16 at the entrance-end thereof when the threads are tightened together. The self-eroding single-use gas-turbine-engine igniter 10 further incorporates a sacrificial outer sleeve 26—for example, constructed of a rigid, combustible material, for example, plastic—that extends axially—relative to the axis of the body 14—into the combustion chamber 18 when assembled to the gas-turbine engine 12, wherein the rigidity of the sacrificial outer sleeve 26 is sufficient to retain the distal portion 26.2 thereof within an ignitable region of the combustion chamber 18 under expected acceleration loads during associated flight conditions to which the associated gas-turbine engine 12 is exposed. A proximal portion 26.1 of the sacrificial outer sleeve 26 is fitted—e.g. in one set of embodiments, press-fitted—onto and over a proximal portion 28.1 of a cylindrical stub shaft portion 28 of the body 14 of the self-eroding single-use gas-turbine-engine igniter 10. The cylindrical stub shaft portion 28 extends beyond the externally-threaded portion 14', and, in one set of embodiments, a distal portion 28.2 thereof is of sufficiently-smaller diameter than the proximal portion 28.1 in order to provide for a gap between the outside of the distal portion 28.2 and the inside of the sacrificial outer sleeve 26 sufficient to accommodate an adhesive for adhesively bonding the sacrificial outer sleeve 26 to the body 14 of the self-eroding single-use gas-turbine-engine igniter 10. A tubular portion 16" of the receptacle 16 distally extends beyond the internally-threaded portion 16', to at least the innermost wall 30 of the combustion chamber 18, and is either sealed—for example, welded, —or at least partially sealed—for example, with a slip-fit or a press-fit—thereto, thereby providing for the receptacle 16 to extend between the outermost 20 and innermost 30 walls of the combustion chamber 18, and, in cooperation with the self-eroding single-use gas-turbine-engine igniter 10, thereby providing for locally at least partially sealing the combustion chamber 18. The inside of the tubular portion 16" of the receptacle 16 is configured to receive the sacrificial outer sleeve 26 of the self-eroding single-use gas-turbine-engine igniter 10, which extends therethrough and into the combustion chamber 18 to a location suitable for initiating combustion therein, when assembled to the gas-turbine engine 12.

Figure 5:
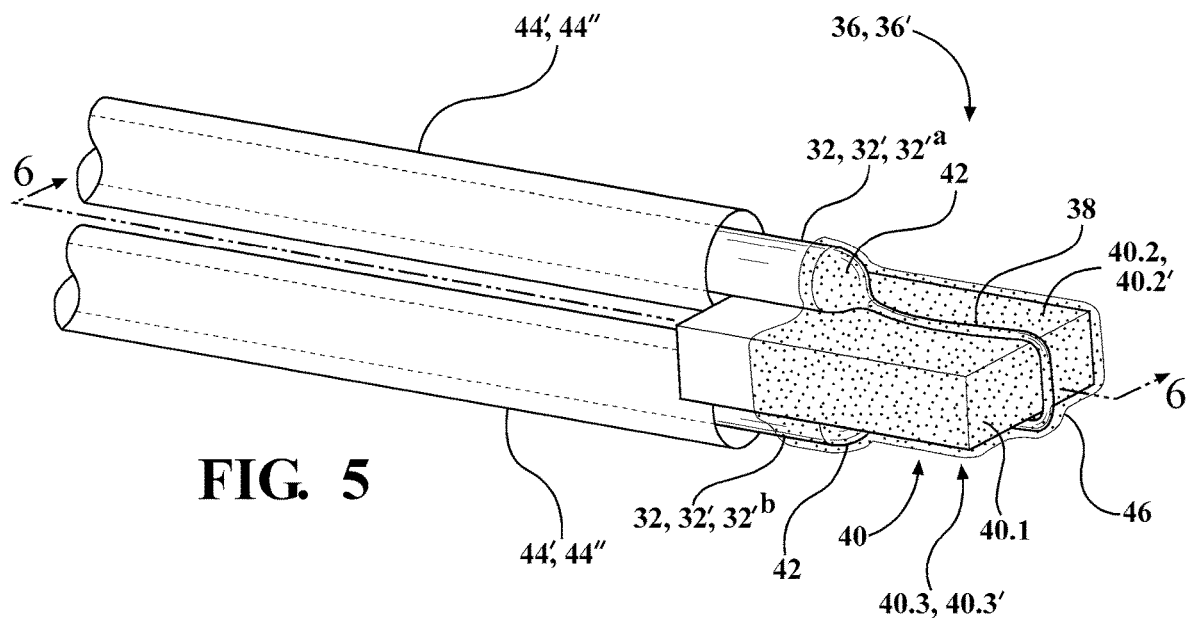
FIG. 5 illustrates a fragmentary isometric view of a first aspect of a bridge-wire initiator and an associated portion of the self-eroding single-use gas-turbine-engine igniter illustrated in FIGS. 1 through 4.
Figure 6:
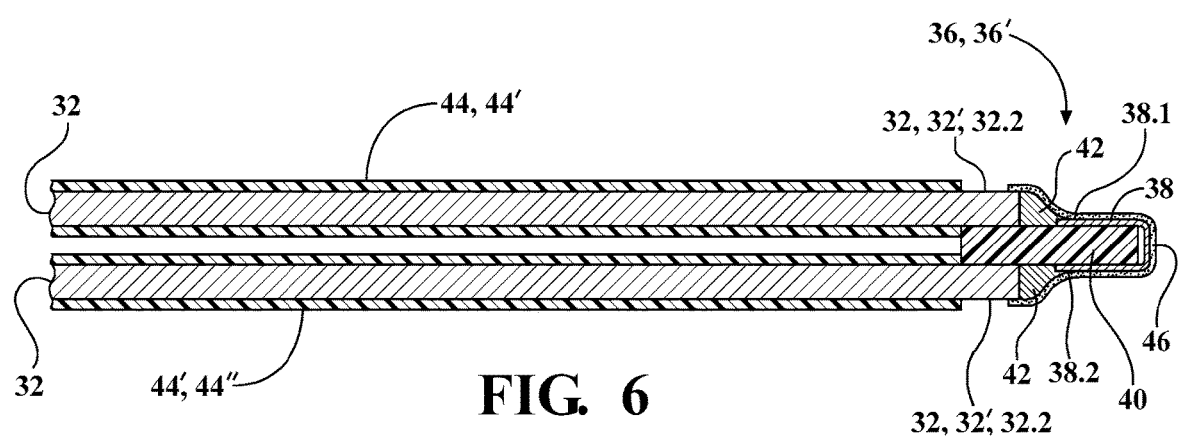
FIG. 6 illustrates a fragmentary side cross-sectional view of the first aspect bridge-wire initiator and the associated portion of the self-eroding single-use gas-turbine-engine igniter illustrated in FIGS. 1 through 5.

An actuation-signal conduit 32, for example, comprising a pair of conductive wires 32, 32' (or more generally, conductive paths)—for example, constructed of aluminum, magnesium, titanium, carbon, or other erodible conductive material—extends through an inner bore 34 of the body 14, and within the sacrificial outer sleeve 26, to an electrically-actuated initiator 36, for example, in accordance with a first aspect, a bridge-wire initiator sub-assembly 36, 36' located proximate to a distal portion 26.2 of the sacrificial outer sleeve 26. The conductive wires 32, 32' are potted—for example, with a non-sacrificial sealant, for example, with a high-temperature-rated potting material, including, but not limited to, a silicon-based composition or a ceramic-based composition—within the inner bore 34 of the body 14, so as to provide for sealing against relatively high temperature and pressure gasses—for example, pressures as high as about 3.5 MPa (500 psi)—in the combustion chamber 18 during operation of the gas-turbine engine 12. Referring also to FIGS. 5 and 6, the bridge-wire initiator sub-assembly 36, 36' incorporates a bridge-wire 38 that is wrapped around an end 40.1 of a substrate 40, the latter of which is located between distal ends 32.2' of the conductive wires 32, 32'. For example, in one set of embodiments, the substrate 40 comprises a non-conductive rigid material—for example, either a polymer or a fibrous board, for example, a circuit board material—that is either sacrificially responsive to operation of the self-eroding single-use gas-turbine-engine igniter 10, or responsive to combustion within the combustion chamber 18 during operation of the gas-turbine engine 12; or otherwise unharmful to operation of the gas-turbine engine 12 following ultimate dissolution of the sacrificial outer sleeve 26, and the contents thereof, of the self-eroding single-use gas-turbine-engine igniter 10. For example, the dissolution of the sacrificial outer sleeve 26, and the contents thereof, would be unharmful to the gas-turbine engine 12, if the dissolution thereof generates particles or debris that is sufficiently-small so as to not be sufficiently damaging to the components of the gas-turbine engine 12 to otherwise result in more than an associated 2 percent reduction in thrust. Each distal end 32.2' of the conductive wires 32, 32' is electrically connected—for example, with solder 42—to a corresponding side 40.2, 40.3 of the substrate 40, and in one set of embodiments to a corresponding end 38.1, 38.2 of the bridge-wire 38. In another set of embodiments, the ends 38.1, 38.2 of the bridge-wire 38 are first connected—for example, soldered—to the corresponding sides 40.2, 40.3 of the substrate 40 to form the bridge-wire initiator sub-assembly 36, 36', which is then subsequently soldered to the distal ends 32.2' of the conductive wires 32, 32'. Accordingly, the substrate 40 of the bridge-wire initiator sub-assembly 36, 36' provides for both spacing the distal ends 32.2' of the conductive wires 32, 32' from one another, and provides for positioning the distal ends 32.2' of the conductive wires 32, 32' so they may be soldered to the bridge-wire 38. For example, in one set of embodiments, the substrate 40 incorporates corresponding conductive layers 40.2', 40.3' on opposing sides 40.2, 40.3 of the substrate 40, but not on the end 40.1 or other surfaces thereof, so that the first 40.2' and second 40.3' conductive layers are insulated from one another except by the bridge-wire 38, extending across the end 40.1 of the substrate 40. The conductive layer 40.2' on the first side 40.2 of the substrate 40 provides for soldering the first end 38.1 of the bridge-wire 38 to the distal end 32.2' of the corresponding first conductive wire $32'^{a}$, and the conductive layer 40.2' on the second side 40.3 of the substrate 40 provides for soldering the second end 38.2 of the bridge-wire 38 to the distal end 32.2' of the corresponding second conductive wire 32, $32'^{b}$. In one set of embodiments, each of the conductive wires 32, 32' is also electrically insulated along its length with either an electrically-insulating coating 44', or covered with an electrically-insulating sleeve 44". The bridge-wire 38 comprises a conductor, for example, a nichrome-alloy, copper or aluminum conductor—which is soldered to the aluminum conductive wires 32, 32'. The bridge-wire igniter sub-assembly 36' further incorporates a highly energetic pyrogen coating 46—for example, BKNO3 (boron-potassium nitrate) or ZPP (zirconium-potassium perchlorate) with a binder such as lacquer—on the exposed surface of the bridge-wire 38, and, for example, in one set of embodiments, furthermore on some or all of the exposed surfaces of the associated substrate 40 and distal ends 32.2 of the associated conductive wires 32, 32' to which the bridge-wire 38 is electrically connected. The bridge-wire 38 has sufficient resistance to both ensure ignition of the pyrogen coating 46 responsive to joule heating from electrical power—in excess of a first threshold—dissipated by the bridge-wire 38, and to prevent ignition of the pyrogen coating 46 responsive to a voltage (or associated dissipated power) that is less than a second threshold.

The sacrificial outer sleeve 26—with the conductive wires 32, 32' and bridge-wire initiator sub-assembly 36, 36' located axially therealong therewithin—is filled with a main pyrotechnic composition 48 that, when ignited by the pyrogen coating 46 responsive to a current therethrough, provides for initiating combustion of fuel/air mixture within the combustion chamber 18 of the gas-turbine engine 12. Accordingly, the sacrificial outer sleeve 26 provides for containing and supporting the main pyrotechnic composition 48. For example, in one set of embodiments, the main pyrotechnic composition 48 is similar to a solid rocket propellant, comprising a combination of ingredients selected from, but not limited to: oxidizers, fuels, catalysts, burn rate modifiers, plasticizes and binders. For example, in one set of embodiments, the main pyrotechnic composition 48 comprises a mixture of ingredients selected from one or more of: ammonium perchlorate, ammonium nitrate, potassium nitrate, aluminum, magnesium, boron, iron oxide, hydroxyl-terminated polybutadiene (HTPB), polybutadiene acrylic acid acrylonitrile pre-polymer (PBAN) and glycidyl azide polymer (GAP).

More particularly, for example, in one set of embodiments, the main pyrotechnic composition 48 comprises a mixture of about 60 to 80 weight percent ammonium perchlorate, 0 to 15 weight percent atomized aluminum 0 to 5 weight percent iron oxide, 1 to 5 weight percent epoxy, 5 to 10 weight percent 2-ethylhexyl acrylate, and 5 to 15 weight percent of a binder comprising one or more of polybutadiene acrylic acid acrylonitrile pre-polymer (PBAN), hydroxyl-terminated polybutadiene (HTPB), or glycidyl azide polymer (GAP). The sacrificial outer sleeve 26 is filled to the distal end thereof with the main pyrotechnic composition 48. In one set of embodiments, some starter pyrogen, for example, similar to that used for the pyrogen coating 46, could be incorporated in the main pyrotechnic composition 48 proximate to the bridge-wire initiator sub-assembly 36, 36' so as to facilitate ignition of the main pyrotechnic composition 48 by the pyrogen coating 46.

When ignited, the pyrogen coating 46 burns at a sufficiently high temperature and with a sufficiently rapid release of thermal energy to ignite the main pyrotechnic composition 48 proximate thereto. Relative to the main pyrotechnic composition 48, the pyrogen coating 46 has a relatively lower ignition threshold, a relatively faster burn rate, and provides for a relatively greater release of specific energy. As used herein, the term pyrogen is intended to mean an energetic, pyrotechnic composition comprising a fuel and an oxidizer, wherein the fuel produces a significant amount of hot particles that cause or promote the ignition of the associated main pyrotechnic composition to be ignited, the latter of which would not be reliably ignited directly responsive to the source of power that provides for ignition of the pyrogen.

In a first embodiment, the conductive wires 32, 32' extend within the self-eroding single-use gas-turbine-engine igniter 10 from the proximal end 14.1 of the body 14 thereof, and through a through-hole 50.1 in the center of a shield barb 50 at the proximal end 52.1 of an externally-threaded plug 52 that is threaded within, and sealed to, a corresponding internally-threaded cavity 54 at the proximal end 14.1 of the body 14. More particularly, a cylindrical surface portion 52" of the externally-threaded plug 52, proximally adjacent to a corresponding relatively-distal threaded portion 52', incorporates an external groove 56 containing a corresponding O-ring 58, the latter of which cooperates with a corresponding proximal cylindrical bore portion 60 of the internally-threaded cavity 54 at the proximal end 14.1 of the body 14, which provides for sealing the proximal end 14.1 of the body 14. The outside surface 50.2 of the shield barb 50 at the proximal end 52.1 of the externally-threaded plug 52 provides for receiving an electrical shield 62 of the associated conductive wires 32, 32', the latter of which are connected to an associated firing circuit (not illustrated) external of the self-eroding single-use gas-turbine-engine igniter 10, wherein the electrical shield 62 may be adapted, e.g. coated or sleeved, so as to provide for sealing the internally-threaded cavity 54 relative to the through-hole 50.1 in the shield barb 50 through which the conductive wires 32, 32' are passed; for example, in cooperation with an associated hose-clamp or wire-tie 64 constricted about the electrical shield 62 over the shield barb 50. The electrical shield 62 provides for shielding the conductive wires 32, 32' from electrical interference, in order to prevent premature ignition of the pyrogen coating 46 as a result thereof.

In accordance with second embodiment, a separate pair of insulated conductive lead-wires of a shielded cable (not illustrated)—from the external firing circuit and routed through the through-hole 50.1 in the shield barb 50—are connected to the pair of conductive wires 32, 32' within the internally-threaded cavity 54, for example, with each pair of insulated conductive lead-wires, and each pair of conductive wires 32, 32', soldered to an associated internal mounting board, for example, a printed circuit board, located within the internally-threaded cavity 54, wherein each insulted conductive lead-wire is connected to a corresponding conductive wire 32, 32' of the self-eroding single-use gas-turbine-engine igniter 10 with a corresponding conductor or conductive trace of the internal mounting board. This second embodiment is otherwise the same as the above-described first embodiment.

In one set of embodiments, the self-eroding single-use gas-turbine-engine igniter 10 is assembled by first bonding the conductive wires 32, 32' to the bridge-wire initiator sub-assembly 36, 36', either before or after the conductive wires 32, 32' are insulated with either the electrically-insulating coatings 44' or the electrically-insulating sleeves 44". Then, the insulated conductive wires 32, 32' are inserted through, and potted within, the inner bore 34 of the body 14, after which the sacrificial outer sleeve 26 is inserted onto, and adhesively bonded to, the cylindrical stub shaft portion 28 of the body 14. Then the main pyrotechnic composition 48 is injected into the sacrificial outer sleeve 26, possibly intermixed or interleaved with starter pyrogen proximate to the bridge-wire initiator sub-assembly 36, 36', and possibly followed by a sealant 66 at the distal end of the sacrificial outer sleeve 26. The main pyrotechnic composition 48, and sealant 66 (if used), are then cured, possibly at an elevated temperature depending upon the composition(s) of the associated ingredients. For the above-described second embodiment, the conductive wires 32, 32' are then connected within the internally-threaded cavity 54 to the corresponding insulated conductive lead-wires of the shielded cable.

In one set of embodiments, the body 14 and the externally-threaded plug 52 are each constructed of high-temperature-rated materials, including, but not limited to, high-temperature-rated metals, for example, including, but not limited to, steel, nickel or cobalt alloys; or ceramic materials; and the receptacle 16 is constructed of a metal that can be welded or brazed to the walls 20, 30 of the combustion chamber 18, and that can withstand the associated operating temperatures thereof.

The self-eroding single-use gas-turbine-engine igniter 10 is ignited by passing a current through the conductive wires 32, 32' and the bridge-wire 38, of sufficient magnitude to ignite the associated pyrogen coating 46, which in turn, ignites the main pyrotechnic composition 48 within the sacrificial outer sleeve 26, which in turn, ignites the fuel-air mixture within the combustion chamber 18 of the gas-turbine engine 12. The self-eroding single-use gas-turbine-engine igniter 10 is located in the gas-turbine engine 12 so that the distal portion 26.2 of the sacrificial outer sleeve 26 is at a location to provide for ignition of the gas-turbine engine 12, for example, in one set of embodiments, at an optimal or near-optimal location that can reduce the amount of main pyrotechnic composition 48 that would otherwise be necessary. The self-eroding single-use gas-turbine-engine igniter 10 does not constitute an explosion hazard because the associated main pyrotechnic composition 48 is not contained in a closed-metallic container.

The main pyrotechnic composition 48 burns at a temperature that is sufficiently-high to both promote combustor ignition as well as self-erode the sacrificial outer sleeve 26 and other components of the self-eroding single-use gas-turbine-engine igniter 10 extending within the combustion chamber 18. After the fuel-air mixture within the combustion chamber 18 of the gas-turbine engine 12 ignited, the resulting continuous combustion within the combustion chamber 18 continues to consume, dissolve or melt any remaining elements of the self-eroding single-use gas-turbine-engine igniter 10 that extend within the combustion chamber 18, until all such elements are either consumed, ejected as relatively innocuous pieces from the gas-turbine engine 12, or otherwise innocuous, resulting in operation of the gas-turbine engine 12 unperturbed by the presence of those elements of the self-eroding single-use gas-turbine-engine igniter 10.

The operative coupling of the self-eroding single-use gas-turbine-engine igniter 10 to the gas-turbine engine 12 is not limited to the above-described direct threaded connection with the combustion chamber 18 thereof, but generally may be operatively coupled via either the combustor, the compressor diffuser, the bypass duct or the engine casing of the gas-turbine engine 12, and secured thereto by either a threaded connection, a snap-ring, a bolted flange, a bracket, a clamp, a pin, or by welding or brazing.

Figure 7A:
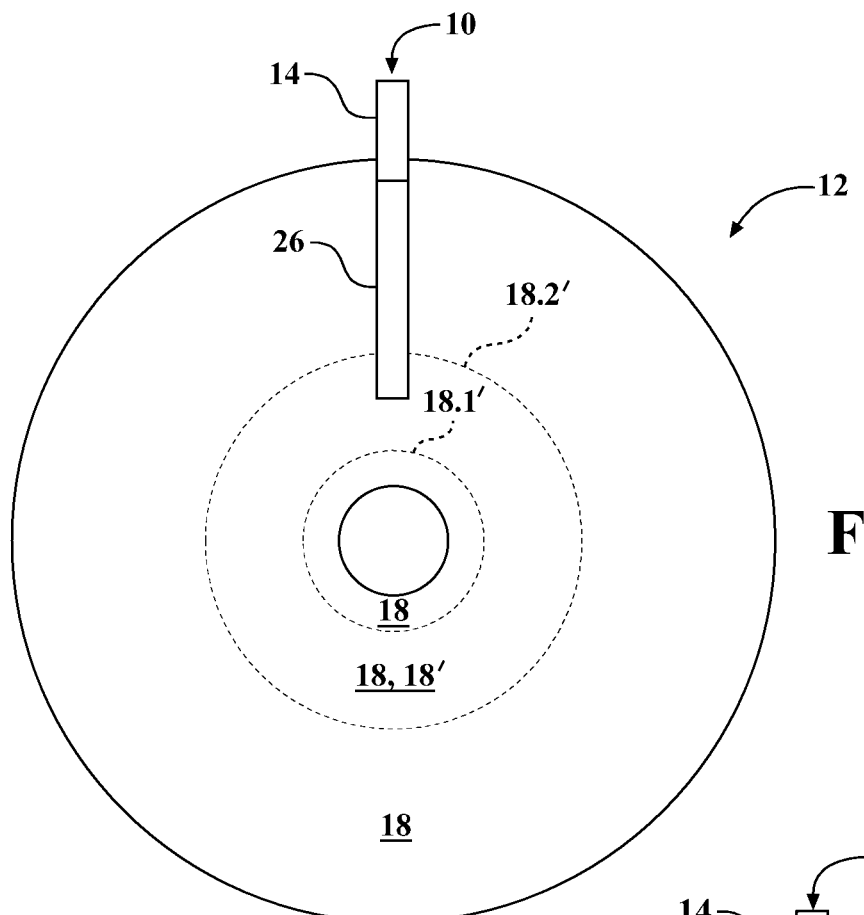
FIG. 7a illustrates a lateral cross-sectional view of a combustion chamber of a gas-turbine engine—viewed axially along the centerline thereof—incorporating a self-eroding single-use gas-turbine-engine igniter with a straight sacrificial outer sleeve at a first location in the combustion chamber.
Figure 7B:
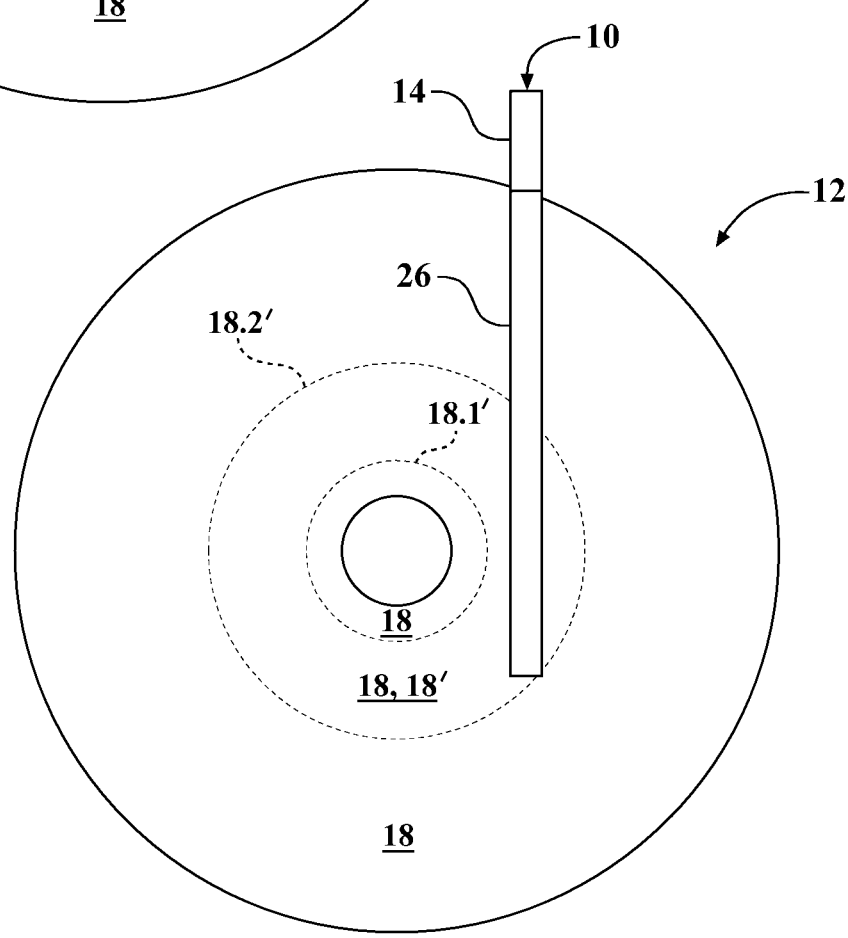
FIG. 7b illustrates a lateral cross-sectional view of a combustion chamber of a gas-turbine engine—viewed axially along the centerline thereof—incorporating a self-eroding single-use gas-turbine-engine igniter with a straight sacrificial outer sleeve at a second location in the combustion chamber.
Figure 7C:
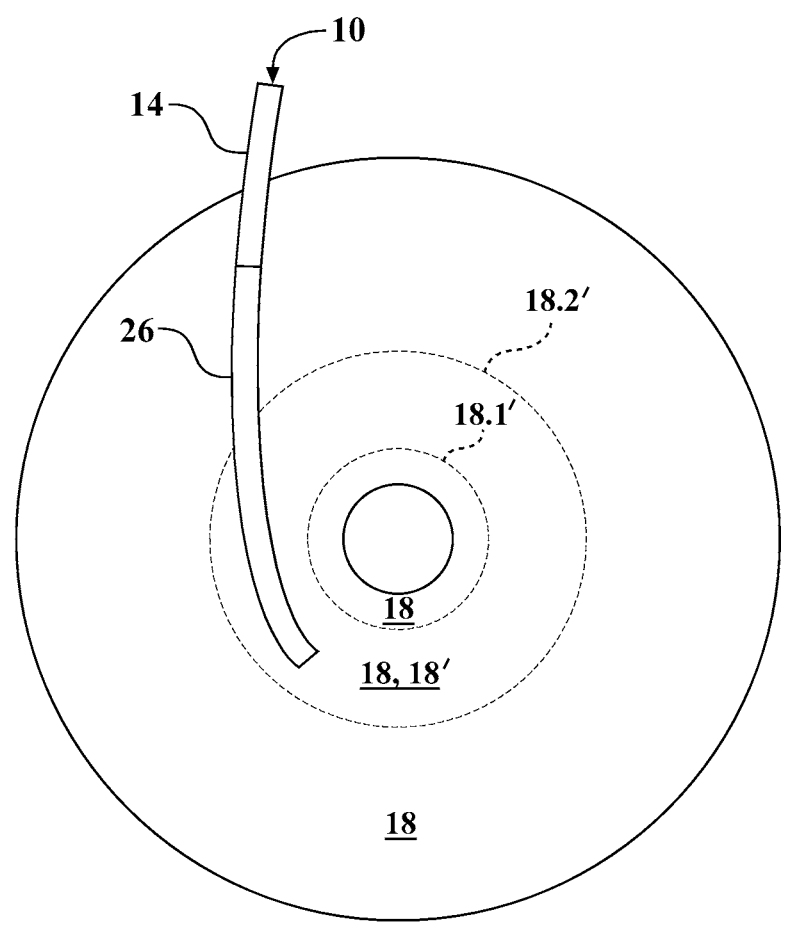
FIG. 7c illustrates a lateral cross-sectional view of a combustion chamber of a gas-turbine engine—viewed axially along the centerline thereof—incorporating a self-eroding single-use gas-turbine-engine igniter with a curved sacrificial outer sleeve at a third location in the combustion chamber.

After initiation, the main pyrotechnic composition 48 in the self-eroding single-use gas-turbine-engine igniter 10 begins to burn proximate to the location of the electrically-actuated initiator 36, 36', and continues to burn towards the proximal portion 26.1 of the sacrificial outer sleeve 26 at a rate of 7.6 to 12.7 millimeters per second (0.3 to 0.5 inches per second), over a period of 2 to 10 seconds, until the main pyrotechnic composition 48 is consumed. Furthermore, referring to FIGS. 7a-7c, once ignited, the dwell time of the burning main pyrotechnic composition 48 within a combustion-ignitable region 18' of the combustion chamber 18—for example, an annular combustion-ignitable region 18' extending between radially-innermost 18.1' and radially-outermost 18.2' boundaries thereof—is responsive to the shape and location of the sacrificial outer sleeve 26 of the self-eroding single-use gas-turbine-engine igniter 10 relative to the combustion chamber 18. More particularly, in the embodiment illustrated in FIG. 7a, the sacrificial outer sleeve 26 of the self-eroding single-use gas turbine engine igniter 10 is substantially straight and symmetrically located within the combustion chamber 18 of the gas-turbine engine 12, with the tip—i.e. the distal portion 26.2—of the associated sacrificial outer sleeve 26 placed within the combustion-ignitable region 18' of the combustion chamber 18. Furthermore, in the embodiment illustrated in FIG. 7b, the sacrificial outer sleeve 26 of the self-eroding single-use gas turbine engine igniter 10 is substantially straight and asymmetrically located within the combustion chamber 18 so as to traverse a relatively greater portion the combustion-ignitable region 18' of the combustion chamber 18, so as to provide for a relatively greater burn duration therewithin. Yet further, in the embodiment illustrated in FIG. 7c, the sacrificial outer sleeve 26 of the self-eroding single-use gas turbine engine igniter 10 is both curved and asymmetrically located within the combustion chamber 18 so as to traverse a relatively greater portion the combustion-ignitable region 18' of the combustion chamber 18, so as to provide for an even greater burn duration therewithin.

Figure 8:
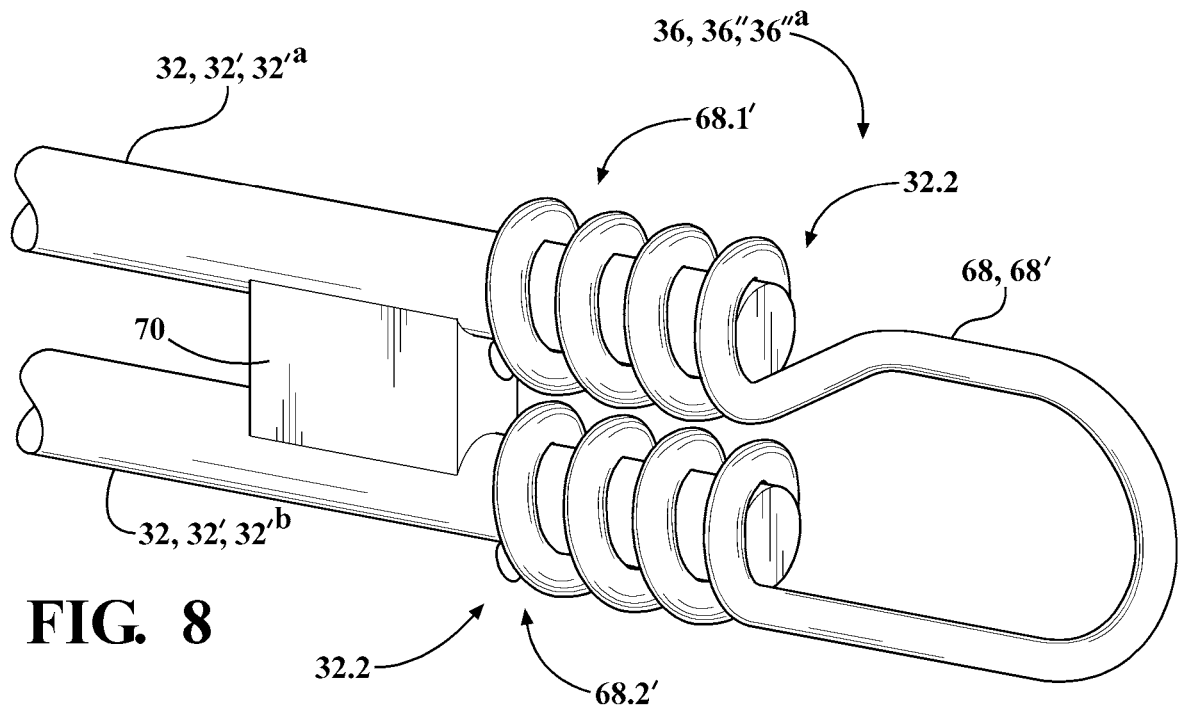
FIG. 8 illustrates an isometric view of a first embodiment of a second aspect of an initiator and an associated portion of an associated self-eroding single-use gas-turbine-engine igniter.
Figure 9:
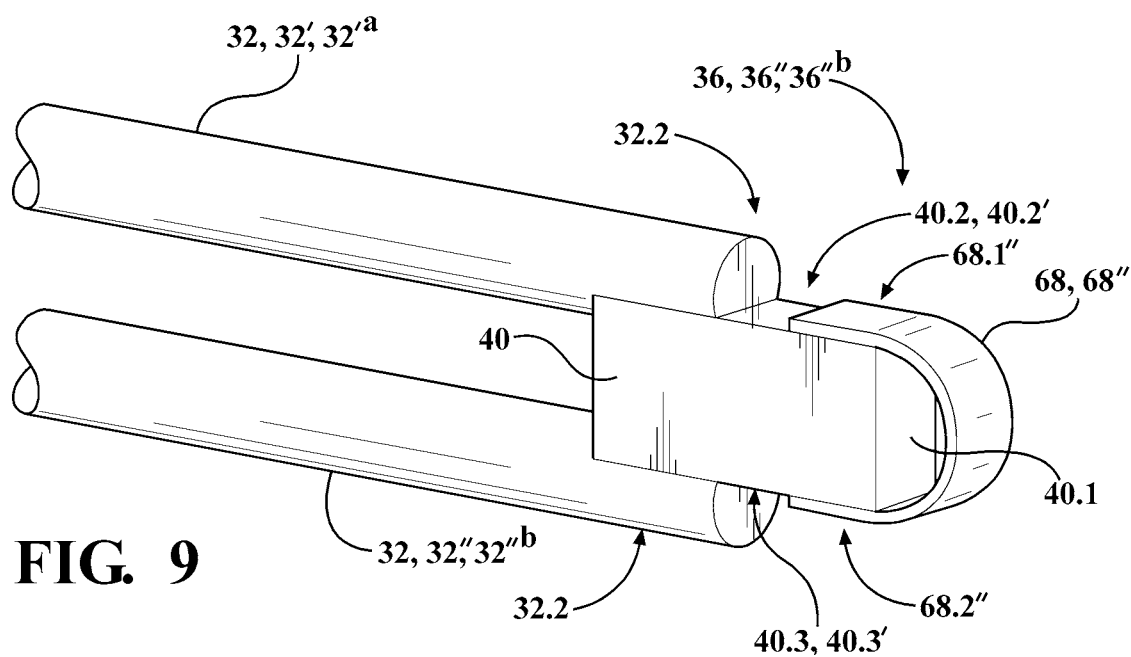
FIG. 9 illustrates isometric view of a second embodiment of the second aspect initiator and an associated portion of an associated self-eroding single-use gas-turbine-engine igniter.

Referring to FIGS. 8 and 9, alternatively, in accordance with a second aspect 36", the electrically-actuated initiator 36, 36" could be provided without an associated pyrogen coating 46 by utilizing an associated conductive element comprising a set of reactive materials 68—for example, either aluminum-nickel (e.g. sold under the trademark Nano-Foil®), aluminum-titanium, titanium-amorphous silicon, titanium-boron or aluminum-palladium (e.g. sold under the trademark Pyrofuze®)—that exothermically react with one another when subjected to sufficient heating, or more particularly, when subjected to sufficient joule heating responsive to an associated electric current conducted therethrough.

As one example, referring to FIG. 8, in accordance with a first embodiment of a second-aspect electrically-actuated initiator 36, 36", 36''', the set of set of reactive materials 68 are formed as a reactive wire 68, 68', the ends 68.1', 68.2' of which are wrapped around above-described corresponding distal ends 32.2 of corresponding conductive wires 32, 32', 32'$^a$, 32'$^b$ of the self-eroding single-use gas turbine engine igniter 10, and then either spot-welded or soldered thereto, wherein the distal ends 32.2 of the conductive wires 32, 32', 32'$^a$, 32'$^b$ separated from, and located with respect to, one another by a corresponding non-conductive separator 70. FIG. 8 illustrates the electrically-actuated initiator 36, 36", 36'''$^a$ either prior to soldering, or with the reactive wire 68, 68' spot-welded to the conductive wires 32, 32', 32'$^a$, 32'$^b$.

As another example, referring to FIG. 9, in accordance with a second embodiment of the second-aspect electrically-actuated initiator 36, 36", 36'''$^b$, the set of set of reactive materials 68 are formed as a reactive foil 68, 68", the ends 68.1", 68.2" of which are wrapped around the sides 40.2, 40.3 and over and end 40.1 of a substrate 40 incorporating associated conductive layers 40.2', 40.3' that provide for an electrical connection of the reactive foil 68, 68" to the corresponding distal ends 32.2 of corresponding conductive wires 32, 32', 32'$^a$, 32'$^b$ of the self-eroding single-use gas turbine engine igniter 10, for example, either by spot-welding or soldering thereto. The distal ends 32.2 of the conductive wires 32, 32', 32'$^a$, 32'$^b$ are separated from, and located with respect to, one another by the substrate 40. FIG. 9 illustrates the electrically-actuated initiator 36, 36", 36'''$^a$ either prior to soldering, or with the ends 68.1", 68.2" of the reactive foil 68, 68" and the conductive wires 32, 32', 32'$^a$, 32'$^b$ each spot-welded to the corresponding conductive layers 40.2', 40.3'.

In accordance with another, alternative aspect, the electrically-actuated initiator 36 could comprise a conductive pyrogen, for example, a conductive pyrogen without an underlying bridge-wire 38, for example, deposited on the surfaces of an underlying substrate 40 along a continuous path between the associated conductive wires 32, 32', 32'$^a$, 32'$^b$. The substrate 40 provides for separating the distal ends 32.2 of the conductive wires 32, 32', 32'$^a$, 32'$^b$ from one another. Associated conductive layers 40.2', 40.3' on opposing sides 40.2, 40.3 thereof may be electrically connected to the corresponding associated conductive wires 32, 32', 32'$^a$, 32'$^b$, for example, with either solder or spot-welds.

In accordance with yet another aspect, the self-eroding single-use gas turbine engine igniter 10 may incorporate an optically-actuated initiator, for example, in accordance with U.S. Pat. No. 6,276,276 B1, issued on 21 Aug. 2001, entitled Thin Film Optical Initiator, which is incorporated herein by reference in its entirety, wherein, for example, the above-described conductive wires 32, 32', 32'a, 32'$^b$ would then be replaced by an associated optical fiber as the associated actuation-signal conduit 32, the latter of which would be sealed to the inner bore 34 of the body 14 as described hereinabove for the conductive wires 32, 32', 32'$^a$, 32'$^b$. In one set of embodiments, the optically-actuated initiator is coated with a pyrogen to provide for igniting the associated main pyrotechnic composition 48.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth the appended claims, and any and all equivalents thereof.

What is claimed is:

1. A self-eroding single-use gas-turbine-engine igniter, comprising:
   a. a sacrificial outer sleeve operatively coupleable to the gas-turbine engine, wherein said sacrificial outer sleeve is constructed of a material that is consumable either responsive to an actuation of the self-eroding single-use gas-turbine-engine igniter or, when operatively coupled to said gas-turbine engine, responsive to a subsequent operation of said gas-turbine engine to which said self-eroding single-use gas-turbine-engine igniter is operatively coupled, and when operatively coupled to said gas-turbine engine and prior to said actuation thereof, said sacrificial outer sleeve extends through a wall of a combustion chamber to be within said combustion chamber of said gas-turbine engine, wherein said sacrificial outer sleeve is rigid and hollow and open at both ends;
   b. an initiator within said sacrificial outer sleeve, wherein said initiator is operatively coupleable to an associated actuation signal via at least one signal conduit operatively associated with said initiator; and
   c. a main pyrotechnic composition contained within said sacrificial outer sleeve, wherein when said self-eroding single-use gas-turbine-engine igniter is operatively coupled to said gas-turbine engine, said initiator provides for igniting said main pyrotechnic composition responsive to said associated actuation signal communicated via said at least one signal conduit, a resulting combustion of said main pyrotechnic composition provides for igniting a fuel-air mixture within said combustion chamber of said gas-turbine engine, and at least one operation selected from the group consisting of a) said resulting combustion of said main pyrotechnic composition and b) a combustion of said fuel-air mixture within said combustion chamber provides for causing a dissolution of said sacrificial outer sleeve within said combustion chamber of said gas-turbine engine.

2. A self-eroding single-use gas-turbine-engine igniter as recited in claim 1, wherein said sacrificial outer sleeve comprises a material that is sufficiently rigid to retain a distal portion of said sacrificial outer sleeve within a combustion-ignitable region of said combustion chamber of said gas-turbine engine prior to actuation of said initiator.

3. A self-eroding single-use gas-turbine-engine igniter as recited in claim 1, wherein said sacrificial outer sleeve comprises a plastic material.

4. A self-eroding single-use gas-turbine-engine igniter as recited in claim 1, wherein a distal end of said sacrificial outer sleeve is sealed so that said main pyrotechnic composition contained therein is not directly exposed to an environment surrounding said sacrificial outer sleeve.

5. A self-eroding single-use gas-turbine-engine igniter as recited in claim 1, wherein said initiator is proximate to a distal portion of said sacrificial outer sleeve that is relatively distal to a location where said sacrificial outer sleeve is operatively coupleable to said gas-turbine engine, and said distal portion is located within said combustion chamber when said sacrificial outer sleeve operatively coupled to said gas-turbine engine.

6. A self-eroding single-use gas-turbine-engine igniter as recited in claim 1, wherein said initiator comprises an electrically-actuated initiator, and said at least one signal conduit comprises a pair of electrically-conductive paths provide for communicating an electrical current though said electrically-actuated initiator.

7. A self-eroding single-use gas-turbine-engine igniter as recited in claim 6, wherein said pair of electrically-conductive paths comprises a pair of electrical conductors extending within said sacrificial outer sleeve.

8. A self-eroding single-use gas-turbine-engine igniter as recited in claim 7, wherein each of said pair of electrical conductors comprises a material selected from the group consisting of aluminum, magnesium, titanium, carbon, and an electrically-conductive material that will erode responsive to either said resulting combustion of said main pyrotechnic composition or the operation of said gas-turbine engine.

9. A self-eroding single-use gas-turbine-engine igniter as recited in claim 7, wherein at least one conductor of said pair of electrical conductors is electrically-insulated within said sacrificial outer sleeve with either an electrically-insulating coating or an electrically-insulating sleeve.

10. A self-eroding single-use gas-turbine-engine igniter as recited in claim 7, further comprising a substrate located between a pair of distal ends of said pair of electrical conductors to which said electrically-actuated initiator is connected, wherein said electrically-actuated initiator is wrapped over an end of said substrate, and each of opposing sides of said substrate abuts a different conductor of said pair of electrical conductors.

11. A self-eroding single-use gas-turbine-engine igniter as recited in claim 10, wherein said substrate comprises a non-conductive rigid material that is either sacrificial, or otherwise unharmful to the operation of said gas-turbine engine following said dissolution of said sacrificial outer sleeve, resulting in no more than a 2 percent reduction in thrust from said gas-turbine engine exclusively as a result of the activation and presence of said self-eroding single-use gas-turbine-engine igniter.

12. A self-eroding single-use gas-turbine-engine igniter as recited in claim 11, wherein said substrate is constructed of either a polymer material or a fibrous-board material.

13. A self-eroding single-use gas-turbine-engine igniter as recited in claim 11, further comprising a corresponding conductive layer on at least one of said opposing sides of said substrate, wherein said corresponding conductive layer is electrically connected to at least one element selected from the group consisting of: a conductor of said pair of electrical conductors and a corresponding end portion of said electrically-actuated initiator.

14. A self-eroding single-use gas-turbine-engine igniter as recited in claim 6, wherein said electrically-actuated initiator comprises a bridge-wire igniter, said bridge-wire igniter incorporates a bridge-wire and a pyrogen coating, said bridge-wire is operatively coupled to said pair of conductive paths, a magnitude of a resistance of said bridge-wire is sufficient to cause ignition of the said pyrogen coating responsive to an electrical power absorbed thereby greater than a first threshold, and said pyrogen coating provides for igniting said main pyrotechnic composition responsive to ignition of said pyrogen coating by the bridge-wire.

15. A self-eroding single-use gas-turbine-engine igniter as recited in claim 14, wherein said magnitude of said resistance of said bridge-wire is greater than a second threshold so as to prevent ignition of said pyrogen coating responsive to a voltage applied across said pair of conductive paths of a magnitude less than a third threshold.

16. A self-eroding single-use gas-turbine-engine igniter as recited in claim 14, wherein a material of said bridge-wire comprises a nichrome-alloy.

17. A self-eroding single-use gas-turbine-engine igniter as recited in claim 14, wherein said pyrogen coating comprises a substance selected from the group consisting of boron-potassium nitrate (BKNO3) and zirconium-potassium perchlorate (ZPP).

18. A self-eroding single-use gas-turbine-engine igniter as recited in claim 6, wherein said electrically-actuated initiator comprises a conductive element incorporating a plurality of reactive materials, said plurality of reactive materials react exothermically with one another responsive to joule heating responsive to an electrical current conducted therethrough, and the exothermic reaction of said plurality of reactive materials generates sufficient heat to ignite said main pyrotechnic composition.

19. A self-eroding single-use gas-turbine-engine igniter as recited in claim 18, wherein said plurality of reactive materials is selected as a pair of reactive materials from the group of pairs of reactive materials consisting of aluminum-nickel, aluminum-titanium, titanium-amorphous silicon, titanium-boron and aluminum-palladium.

20. A self-eroding single-use gas-turbine-engine igniter as recited in claim 1, wherein said main pyrotechnic composition comprises a combination of ingredients selected from the group consisting of: an oxidizer, a fuel, a catalyst, a burn-rate modifier, a plasticize and a binder.

21. A self-eroding single-use gas-turbine-engine igniter as recited in claim 1, wherein said main pyrotechnic composition comprises a combination of ingredients selected from the group consisting of: ammonium perchlorate, ammonium nitrate, potassium nitrate, aluminum, magnesium, boron, iron oxide, hydroxyl-terminated polybutadiene (HTPB), polybutadiene acrylic acid acrylonitrile pre-polymer (PBAN), and glycidyl azide polymer (GAP).

22. A self-eroding single-use gas-turbine-engine igniter as recited in claim 1 wherein said main pyrotechnic composition comprises a mixture comprising 60 to 80 weight percent ammonium perchlorate; 5 to 15 weight percent of a binder selected from the group consisting of polybutadiene acrylic acid acrylonitrile pre-polymer (PBAN), hydroxyl-terminated polybutadiene (HTPB) and glycidyl azide polymer (GAP); 1 to 5 weight percent epoxy; and 5 to 10 weight percent 2-ethylhexyl acrylate.

23. A self-eroding single-use gas-turbine-engine igniter as recited in claim 22, wherein said main pyrotechnic composition further comprises up to 15 weight percent atomized aluminum.

24. A self-eroding single-use gas-turbine-engine igniter as recited in claim 22, wherein said main pyrotechnic composition further comprises up to 5 weight percent iron oxide.

25. A self-eroding single-use gas-turbine-engine igniter as recited in claim 1, further comprising a body of said self-eroding single-use gas-turbine-engine igniter, wherein said sacrificial outer sleeve is operatively coupled to said body, said body provides for operatively coupling said sacrificial outer sleeve to said gas-turbine engine, and said at least one signal conduit extends through said body and is sealed thereto so as to prevent escape of combustion gases from said gas-turbine engine.

26. A self-eroding single-use gas-turbine-engine igniter as recited in claim 25, wherein said body is constructed of a high-temperature-rated material comprising a material selected from the group consisting of steel, a nickel alloy, a cobalt alloy, and a ceramic material.

27. A self-eroding single-use gas-turbine-engine igniter as recited in claim 25, wherein said body comprises:
   a. an externally-threaded portion that provides for operatively coupling said self-eroding single-use gas-turbine-engine igniter to said gas-turbine engine; and
   b. a cylindrical stub-shaft portion extending beyond said externally-threaded portion, wherein said cylindrical stub-shaft portion provides for receiving a proximal end portion of said sacrificial outer sleeve.

28. A self-eroding single-use gas-turbine-engine igniter as recited in claim 25, wherein said at least one signal conduit comprises either a pair of conductors or an optical fiber extending through an inner bore of said body and within sacrificial outer sleeve, and said at least one signal conduit is potted within said inner bore of said body with a sealant that can maintain a sealed condition following operation of said self-eroding single-use gas-turbine-engine igniter and during operation of said gas-turbine engine.

29. A self-eroding single-use gas-turbine-engine igniter as recited in claim 25, further comprising a receptacle operatively coupled to said gas-turbine engine and configured to receive said body, wherein said receptacle comprises:
   a. a tubular portion that extends distally from a relatively-proximal externally-accessible surface of said gas-turbine engine to a relatively-distal inside surface of an innermost wall of said combustion chamber; and
   b. an inner bore of sufficient inside diameter so as to provide for receiving said sacrificial outer sleeve therethrough.

30. A self-eroding single-use gas-turbine-engine igniter as recited in claim 29, wherein a distal portion of said tubular portion is sealed to said innermost wall of said combustion chamber with either a weld, a slip-fit or a press-fit.

31. A self-eroding single-use gas-turbine-engine igniter as recited in claim 27, further comprising a receptacle operatively coupled to said gas-turbine engine and configured to receive said body, wherein said receptacle comprises:
   a. a tubular portion that extends distally from a relatively-proximal externally-accessible surface of said gas-turbine engine to a relatively-distal inside surface of an innermost wall of said combustion chamber; and
   b. an inner bore of sufficient inside diameter so as to provide for receiving said sacrificial outer sleeve therethrough, wherein a proximal portion of said receptacle is internally threaded so as to cooperate with said externally-threaded portion of said body, and an annular face of said receptacle provides for sealing against a corresponding annular face of said body.

32. A self-eroding single-use gas-turbine-engine igniter as recited in claim 25, further comprising an externally-threaded plug that provides for cooperating with an internally-threaded portion of a cavity in a proximal portion of said body, wherein said externally-threaded plug comprises:
   a. an external cylindrical surface incorporating an external groove that, together with a sealing element within said external groove, cooperates with a corresponding bore in said proximal portion of said body so as to provide for sealing an outside of said externally-threaded plug to an inside of said body; and
   b. an inner bore through which said at least one signal conduit is routed.

33. A self-eroding single-use gas-turbine-engine igniter as recited in claim 32, wherein said externally-threaded plug incorporates a shield-barb portion incorporating said inner bore, and an outside surface of said shield-barb portion provides for receiving an electrical shield that provides for electrically shielding said at least one signal conduit.

34. A self-eroding single-use gas-turbine-engine igniter as recited in claim 32, further comprising an interface within said cavity that provides for coupling at least one externally-extending signal conduit to a corresponding at least one signal conduit of said at least one signal conduit, wherein said at least one externally-extending signal conduit extends through said inner bore of said externally-threaded plug.

35. A method of starting a gas-turbine engine, comprising: actuating an initiator located within a sacrificial outer sleeve inserted within a combustion chamber of the gas-turbine engine sufficiently far within a combustion chamber of said gas-turbine engine so that at least a portion of said sacrificial outer sleeve is within a combustion-ignitable region of said combustion chamber, wherein the actuation of said initiator within said combustion chamber causes an ignition of a main pyrotechnic composition within said sacrificial outer sleeve, a resulting combustion of said main pyrotechnic composition following the ignition thereof causes a fuel-air mixture within said combustion chamber of said gas-turbine engine to combust and thereby start said gas-turbine engine, at least one operation selected from the group consisting of a) said resulting combustion of said main pyrotechnic composition and b) a combustion of said fuel-air mixture within said combustion chamber causes within said combustion chamber a dissolution of said sacrificial outer sleeve and at least a substantial portion of the contents thereof, and an operative coupling of said sacrificial outer sleeve to said gas-turbine engine provides for preventing an escape of combustion gases from said gas-turbine engine therethrough following operation of self-eroding single-use gas-turbine-engine igniter.

36. A method of providing for starting a gas-turbine engine, comprising:
providing for actuating an initiator located within a sacrificial outer sleeve inserted within a combustion chamber of the gas-turbine engine sufficiently far within a combustion chamber of said gas-turbine so that at least a portion of said sacrificial outer sleeve is within a combustion-ignitable region of said combustion chamber, wherein the actuation of said initiator within said combustion chamber causes an ignition of a main pyrotechnic composition within said sacrificial outer sleeve, a resulting combustion of said main pyrotechnic composition following the ignition thereof causes a fuel-air mixture within said combustion chamber of said gas-turbine engine to combust and thereby start said gas-turbine engine at least one operation selected from the group consisting of a) said resulting combustion of said main pyrotechnic composition and b) a combustion of said fuel-air mixture within said combustion chamber causes within said combustion chamber a dissolution of said sacrificial outer sleeve and at least a substantial portion of the contents thereof, and an operative coupling of said sacrificial outer sleeve to said gas-turbine engine provides for preventing an escape of combustion gases from said gas-turbine engine-igniter.

37. A self-eroding single-use gas-turbine-engine igniter as recited in claim 1, wherein said sacrificial outer sleeve extends sufficiently far within said combustion chamber of said gas-turbine engine so that at least a portion of said sacrificial outer sleeve is within a combustion-ignitable region of said combustion chamber, and the operative coupling of said sacrificial outer sleeve to said gas-turbine engine provides for preventing an escape of combustion gases from said gas-turbine engine therethrough following operation of said self-eroding single-use gas-turbine-engine igniter.

* * * * *